(12) United States Patent
Liu et al.

(10) Patent No.: US 11,292,220 B2
(45) Date of Patent: Apr. 5, 2022

(54) REWORK PRESS ASSEMBLY FOR COMPONENT REWORK SYSTEMS AND METHODS OF USING THE SAME

(71) Applicant: General Electric Company, Schenectady, NY (US)

(72) Inventors: Shan Liu, Central, SC (US); Paul Stephen Dimascio, Greer, SC (US); Jonathan Matthew Lomas, Simpsonville, SC (US); Alexander Regan Fannin, Mauldin, SC (US); Carrie Lynn Grimard, Taylors, SC (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 351 days.

(21) Appl. No.: 15/974,197

(22) Filed: May 8, 2018

(65) Prior Publication Data
US 2019/0344522 A1 Nov. 14, 2019

(51) Int. Cl.
 *B30B 15/06* (2006.01)
 *B21D 3/10* (2006.01)
 (Continued)

(52) U.S. Cl.
 CPC .............. *B30B 15/064* (2013.01); *B21D 3/10* (2013.01); *B23P 6/00* (2013.01); *B30B 15/026* (2013.01); *B30B 15/34* (2013.01); *C21D 8/00* (2013.01)

(58) Field of Classification Search
 CPC .. B23P 6/00; B23P 6/002; B23P 6/005; B23P 15/02; F05D 2230/80; B23K 37/0435;
 (Continued)

(56) References Cited

U.S. PATENT DOCUMENTS 3,060,564 A 10/1962 Corral
4,046,500 A * 9/1977 Pfeiffer ................ B30B 15/062
 425/407
(Continued)

FOREIGN PATENT DOCUMENTS

EP 0824981 A1 2/1998
JP S6178599 A 4/1986
(Continued)

OTHER PUBLICATIONS

Gu et al—Numerical Simulation of Heat Treatment Based on Model with Expanded Solution Domain, pp. 2-3, Jul. 2012 (Year: 2012).*
(Continued)

*Primary Examiner* — Adam J Eiseman
*Assistant Examiner* — P Derek Pressley
(74) *Attorney, Agent, or Firm* — Armstrong Teasdale LLP (57) ABSTRACT

A rework press assembly for reworking a dimensionally non-conformant component is provided. The rework press assembly includes a frame, a die coupled to the frame and configured to contact a first portion of the component, and a ram. The ram is coupled to the frame opposite the die with respect to an axis of the rework press assembly and is configured to contact a second portion of the component. The ram and the die define a component cavity therebetween. At least one of the die and the ram has a first length, relative to the axis, in response to the rework press assembly being at a first thermal condition. The at least one of the die and the ram has a second length, relative to the axis, in response to the rework press assembly being at a second thermal condition, and the second length is greater than the first length.

19 Claims, 7 Drawing Sheets

(51) Int. Cl.
  *B23P 6/00*     (2006.01)
  *B30B 15/02*    (2006.01)
  *B30B 15/34*    (2006.01)
  *C21D 8/00*     (2006.01)

(58) Field of Classification Search
  CPC ...... B23K 2101/001; B21D 3/10; B21D 3/14;
                  B21D 5/01; B21D 37/16; B30B 1/005;
                  B30B 15/026; B30B 15/064; B30B 15/34;
                                   B23Q 3/06; B23Q 3/103
  USPC .......................................... 29/235, 255, 278
  See application file for complete search history.

(56) References Cited

U.S. PATENT DOCUMENTS

| | | | |
|---|---|---|---|
| 4,188,811 A | 2/1980 | Brimm | |
| 4,242,899 A | 1/1981 | Raymond | |
| 4,441,874 A | 4/1984 | Kumar et al. | |
| 6,228,200 B1 * | 5/2001 | Willis | B30B 1/005 |
| | | | 100/321 |
| 6,910,358 B2 * | 6/2005 | Schroth | B21D 22/02 |
| | | | 72/297 |
| 7,118,021 B2 * | 10/2006 | Swartzbeck | B23K 37/0435 |
| | | | 228/44.3 |
| 7,431,780 B2 | 10/2008 | Myhr et al. | |
| 7,476,358 B2 | 1/2009 | Rosenzweig et al. | |
| 7,686,900 B2 | 3/2010 | Rosenzweig et al. | |
| 2005/0109816 A1 | 5/2005 | Swartzbeck et al. | |
| 2013/0192255 A1 | 8/2013 | Hunt et al. | |
| 2014/0117007 A1 | 5/2014 | Trapp et al. | |
| 2016/0016255 A1 | 1/2016 | Bruck et al. | |

FOREIGN PATENT DOCUMENTS

| | | | | |
|---|---|---|---|---|
| JP | H02187298 A | | 7/1997 | |
| JP | 2001055928 A | * | 2/2001 | ............. B23P 6/045 |
| JP | 2001055928 A | | 2/2001 | |
| JP | 2004052079 A | | 2/2004 | |

OTHER PUBLICATIONS

Chen et al—Diffusion Mechanismns of Fin Scale Gamma Prime in an Advanced Ni-Based Super Alloy, p. 1, 2014 (Year: 2014).*
Saito—JP2001055928A—Translation May 13, 2021 (Year: 2001).*
Notice of Reasons for Refusal for JP Patent Application 2019-088297 drafted May 21, 2020; 7 pp.
EP Extended Search Report for related application 19171407.0-1019 dated Oct. 8, 2019; 10 pp.
JPO Decision of Refusal for Patent Application JP 2019088297 drafted Sep. 24, 2020; 10 pp.

* cited by examiner

REWORK PRESS ASSEMBLY FOR COMPONENT REWORK SYSTEMS AND METHODS OF USING THE SAME

BACKGROUND

The field of the disclosure relates generally to reworking components having non-conforming dimensional properties, and more particularly to reworking dimensionally non-conforming components, such as those having high strength and low ductility, using a rework press assembly at elevated temperatures to inhibit introduction of residual stresses into the components.

At least some known components experience dimensional distortions from an initial manufacturing process, a heat treating process, and/or operational use of the components. For example, at least some known components experience dimensional distortions during the heat treating process resulting at least from thermal expansion of the components and/or residual stresses within the components. In at least some cases, the components may have to undergo a rework process to correct the dimensional distortions and to qualify the components for operational use. However, reworking a component formed from a material having low strength and high ductility material properties using at least some known processes may leave residual stresses throughout the component. For example, one known reworking process is a "hot spotting" process that heats one side of a distorted area of a component until the material yields, while an opposing side remains elastic and expands, causing the distorted area to deform towards the heated area. However, reworking a component formed from a material having low strength and high ductility properties using a hot spotting process may leave residual stresses in the area that was heated.

Moreover, in at least some other known processes, reworking a component formed from a material having high strength and low ductility properties may result in degraded mechanical properties at the location of the rework. For example, reworking a component formed from a high strength and low ductility material by brazing to fill a depression in the component and/or by machining high spots in the component may cause a change in the properties of the component at the site of the rework due to the differing material (as a result of the brazing process) and/or material removed from the area of rework (as a result of the machining process), limiting the rework of the component using these processes to non-critical areas of the component.

BRIEF DESCRIPTION

In one aspect, a rework press assembly for reworking a dimensionally non-conformant component is provided. The rework press assembly includes a frame, a die coupled to the frame and configured to contact a first portion of the component, and a ram. The ram is coupled to the frame opposite the die with respect to an axis of the rework press assembly and is configured to contact a second portion of the component. The ram and the die define a component cavity therebetween. At least one of the die and the ram has a first length, relative to the axis, in response to the rework press assembly being at a first thermal condition. The at least one of the die and the ram has a second length, relative to the axis, in response to the press being at a second thermal condition, and the second length is greater than the first length.

In another aspect, a component rework system is provided. The component rework system includes a heat treating enclosure, including an inner environment configured to receive thermal energy, and a rework press assembly for reworking a dimensionally non-conformant component. The rework press assembly is positioned within the inner environment and includes a frame, a die coupled to the frame and configured to contact a first portion of the component, and a ram. The ram is coupled to the frame opposite the die with respect to an axis of the rework press assembly and is configured to contact a second portion of the component. The ram and the die define a component cavity therebetween. At least one of the die and the ram has a first length, relative to the axis, in response to the rework press assembly being at a first thermal condition. The at least one of the die and the ram has a second length, relative to the axis, in response to the press being at a second thermal condition, and the second length is greater than the first length.

In yet another aspect, a method of reworking a component is provided. The method includes positioning a component within a component cavity of a rework press assembly. The rework press assembly includes a frame, a die coupled to the frame and configured to contact a first portion of the component, and a ram. The ram is coupled to the frame opposite the die with respect to an axis of the rework press assembly and is configured to contact a second portion of the component. The ram and the die define a component cavity therebetween. At least one of the die and the ram has a first length, relative to the axis, in response to the rework press assembly being at a first thermal condition. The at least one of the die and the ram has a second length, relative to the axis, in response to the press being at a second thermal condition, and the second length is greater than the first length. The method also includes positioning the rework press assembly and the component within a heat treating enclosure at the first thermal condition. Finally, the method includes increasing a temperature within the heat treating enclosure until the rework press assembly is at the second thermal condition.

DETAILED DESCRIPTION

The embodiments described herein overcome at least some of the disadvantages of known rework systems, such as but not limited to components having high strength and low ductility material properties, including components formed from superalloys. The embodiments include a rework press assembly for reworking a dimensionally distorted component. The rework press assembly includes a die configured to contact a first portion of the component, a ram configured to contact a second portion of the component, and a frame extending between the die and the ram. The ram is positioned opposite the die and defines a component cavity therebetween. The ram has a first length in response to the rework press assembly being at a first thermal condition and has a greater second length in response to the press being at a second thermal condition. Thus, after positioning the component to be reworked within the component cavity between the die and the ram, the temperature of the rework press assembly and the component is elevated to a predetermined temperature selected to result in a length increase of the ram such that the ram compresses the component by a predetermined amount to correct the dimensional distortion. In some embodiments, the die and the ram are contoured complementarily to dimensionally correct end profiles of the component to facilitate precise reworking of the component.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

Figure 1:
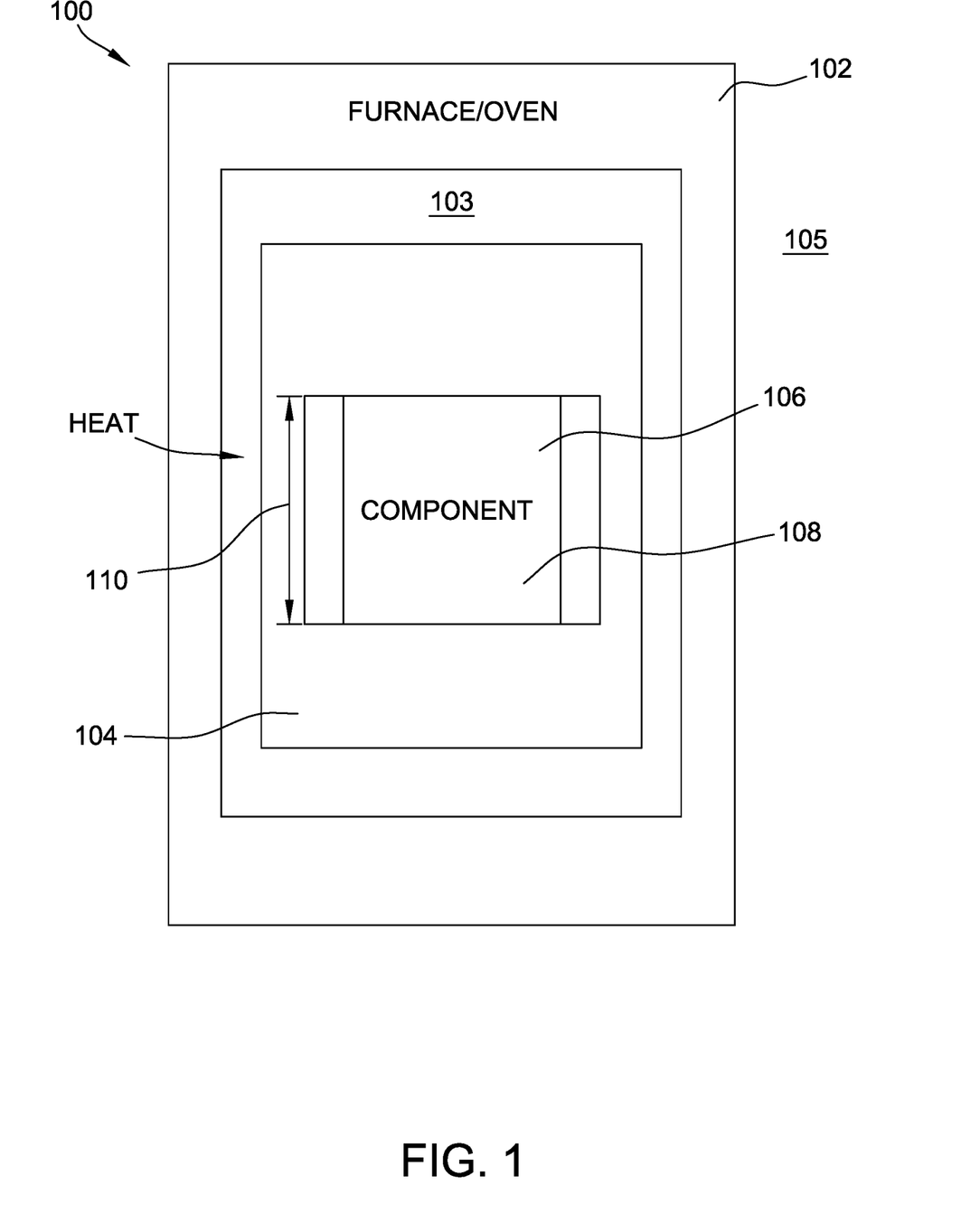
FIG. 1 is a block diagram of an exemplary component rework system.

FIG. 1 is a block diagram of an exemplary component rework system 100. In the exemplary embodiment, component rework system 100 includes a heat treating enclosure 102. An inner environment 103 of enclosure 102 is at least partially thermally isolated from an outer environment 105 that surrounds heat treating enclosure 102. A rework press assembly 104 and a component 106 having a component length 110 and formed from a material 108 are positioned within inner environment 103, and thermal energy is introduced into inner environment 103. In the exemplary embodiment, thermal energy is introduced into inner environment 103 of heat treating enclosure 102 via heated air at atmospheric pressure until inner environment 103 reaches a desired temperature. In alternative embodiments, inner environment 103 includes any type of inert gas at any pressure that facilitates operation of component rework system 100 as described herein. The elevated temperature within heat treating enclosure 102 facilitates reworking component 106 as will be described further herein.

In the exemplary embodiment, heat treating enclosure 102 is a batch furnace 102 configured to generate internal temperatures up to and including 2300° F. In alternative embodiments, heat treating enclosure 102 is one of a box-type furnace, a car-type furnace, an elevator-type furnace, a bell-type furnace, a pit furnace, a salt bath furnace, and a fluidized bed furnace. In other alternative embodiments, heat treating enclosure 102 is any thermal energy generation apparatus capable of generating an internal temperature sufficiently high to cause a softening of a matrix of material 108 of component 106.

Figure 2:
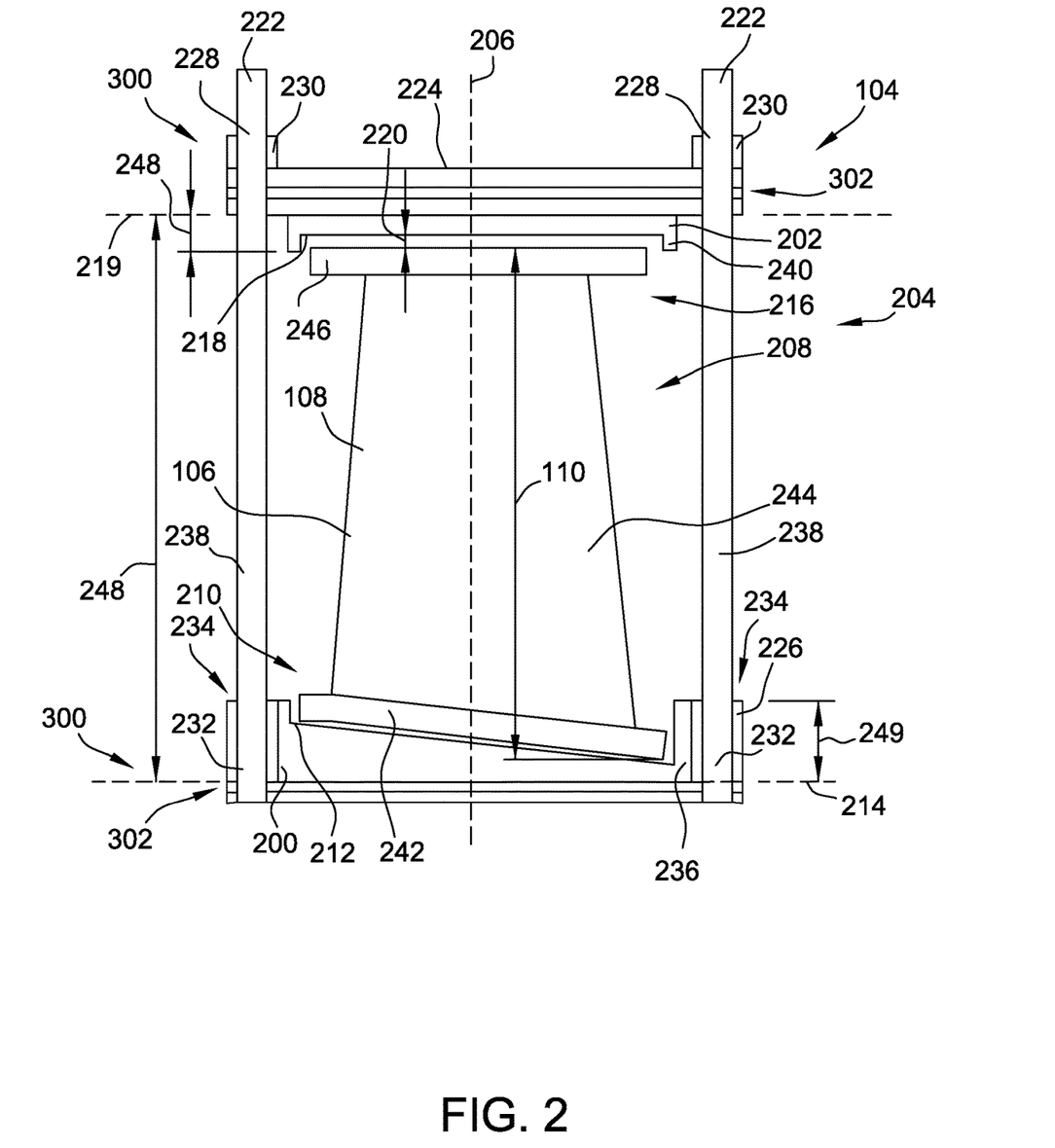
FIG. 2 is a cross-sectional side view of an exemplary rework press assembly that may be used with the component rework system shown in FIG. 1 illustrating the rework press assembly at an exemplary first thermal condition.
Figure 3:
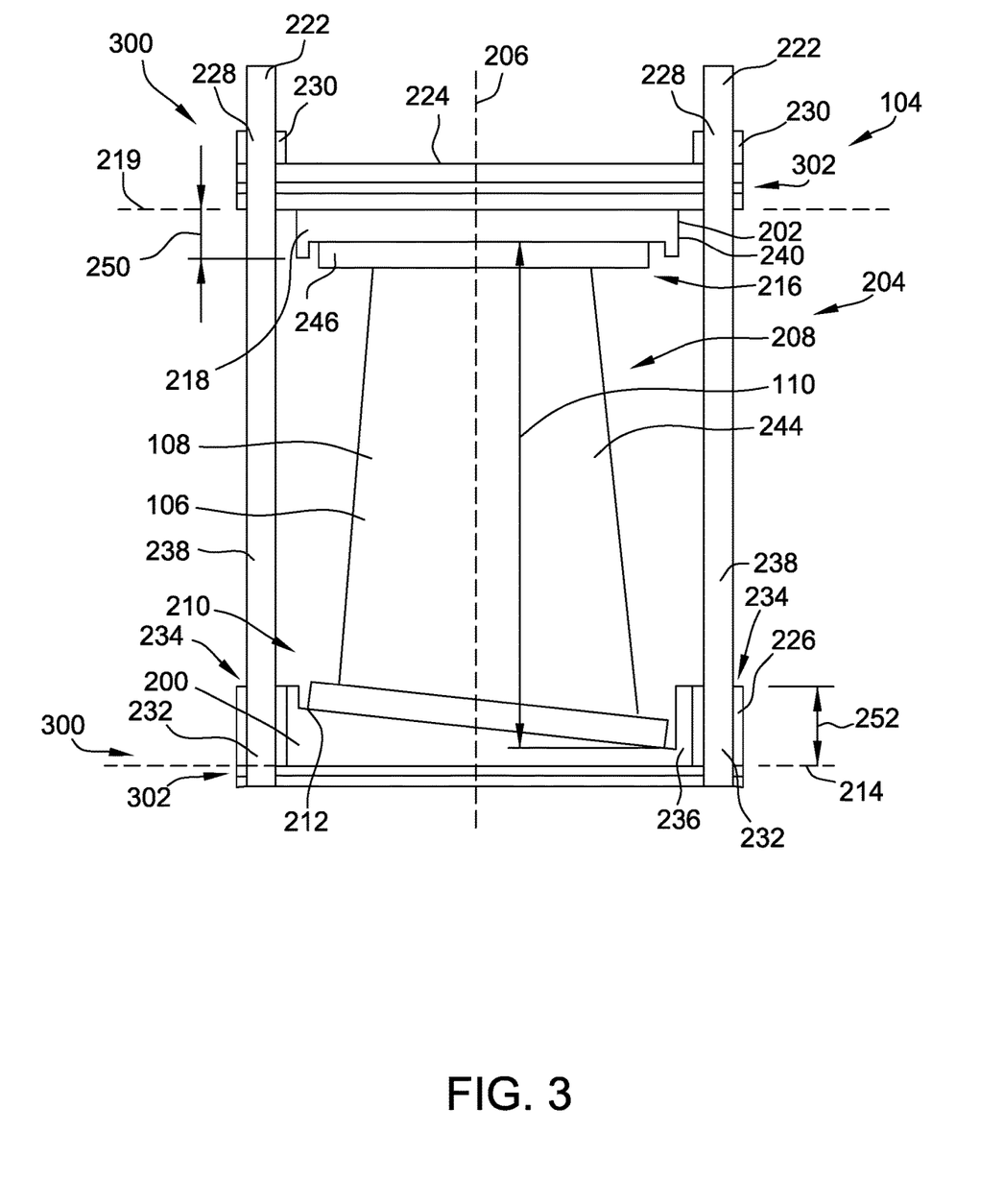
FIG. 3 is a cross-sectional side view of the rework press assembly shown in FIG. 2 illustrating the rework press assembly at an exemplary second thermal condition.

FIG. 2 is a cross-sectional side view of exemplary rework press assembly 104 that can be used with component rework system 100 (shown in FIG. 1) illustrating rework press assembly 104 at an exemplary first thermal condition. FIG. 3 is a cross-sectional side view of rework press assembly 104 (shown in FIG. 2) illustrating rework press assembly 104 at an exemplary second thermal condition. In the exemplary embodiment, rework press assembly 104 includes a die 200 coupled to a frame 204, and a ram 202 coupled to frame 204 opposite die 200 with respect to a press longitudinal axis 206. Component 106 is positioned within a component cavity 208 defined between die 200 and ram 202. In alternative embodiments, rework press assembly 104 includes any number of dies 200 and rams 202 positioned in any orientation relative to press longitudinal axis 206 that facilitates operation of component rework system 100 as described herein.

In the exemplary embodiment, die 200 is configured to contact a first portion 210 of component 106 and is coupled to a die support 226 of frame 204. Die 200 includes a die forming surface 212 contoured complementary to a dimensionally correct profile of first portion 210 of component 106. In alternative embodiments, die 200 includes a plurality of dies 200, wherein the plurality of dies 200 are positionable at a plurality of locations along a die plane 214 defined along a surface of die support 226 and substantially perpendicular to press longitudinal axis 206. In further alternative embodiments, die 200 has any configuration that facilitates operation of component rework system 100 as described herein.

In the exemplary embodiment, ram 202 is configured to contact a second portion 216 of component 106 and is coupled to a ram support 224 of frame 204 opposite die 200. Ram 202 includes a ram forming surface 218 contoured complementary to a dimensionally correct profile of second portion 216 of component 106. In alternative embodiments, ram 202 includes a plurality of rams 202, wherein the plurality of rams 202 are positionable along a ram plane 219 defined along a surface of ram support 224 and substantially perpendicular to press longitudinal axis 206. In a further alternative embodiment, ram 202 does not contact component 106 at the first thermal condition and is spaced apart from first portion 210 by a ram gap 220 at the first thermal condition. In further alternative embodiments, ram 202 has any configuration that facilitates operation of component rework system 100 as described herein.

In the exemplary embodiment, frame 204 extends between die 200 and ram 202. More specifically, frame 204 includes a plurality of support rods 222, ram support 224, and die support 226. Each support rod 222 is coupled to, and extends between and through, ram support 224 and die support 226. In the exemplary embodiment, ram support 224 is configured to retain ram 202 substantially perpendicular to press longitudinal axis 206, and die support 226 is configured to retain die 200 substantially perpendicular to press longitudinal axis 206. In an alternative embodiment, frame 204 is a single, monolithic component including die 200 and is configured to retain ram 202. In further alternative embodiments, frame 204 includes any component in any configuration that facilitates operation of rework press assembly 104 as described herein.

In the exemplary embodiment, support rods 222 are receivable through die support 226 and ram support 224 such that die support 226 and ram support 224 are coupled together. More specifically each support rod 222 includes a threaded portion 228 that is engageable with threads (not numbered) in a respective one of a plurality of nuts 230. Each nut 230 is threadably advanceable along a respective one of support rods 222 against ram support 224 such that ram gap 220 is decreased until a preselected width of ram gap 220 is obtained. Additionally, each support rod 222 includes a tapered portion 232 that is engageable within a respective one of a pair of complementarily tapered through-holes 234 extending through die support 226. Each tapered through-hole 234 is contoured complementary to tapered portion 232 of the corresponding support rod 222 and interfaces with tapered portion 232 such that support rod 222 facilitates retaining die 200 against first portion 210 of component 106, but is inhibited from being fully drawn through die support 226 towards ram 202. In an alternative embodiment, support rods 222, die support 226, and ram support 224 are configured to cooperate in any way that facilitates operation of rework press assembly 104 as described herein.

In the exemplary embodiment, frame 204 includes a cooling system 300. Cooling system 300 includes cooling passageways 302 configured to route a flow of cooling fluid through frame 204 and die 200. More specifically, a first cooling passageway 302 extends through die support 226 and a second cooling passageway 302 extends through ram support 224. Additionally or alternatively, support rods 222 include cooling passageways 302. In the exemplary embodiment, the cooling fluid ethylene glycol. In an alternative embodiment, the cooling fluid includes at least one of propylene glycol, a high-temperature coolant, a refrigerant, a cooling gas, or another suitable coolant. A pump (not shown) is configured to circulate the cooling fluid through cooling passageways 302 and to a heat exchanger (not shown) to facilitate thermal energy exchange between the cooling fluid and the portions of rework press assembly 104 that include cooling passageways 302. A cooling capability of cooling system is determined by selecting at least one of the volume of the cooling fluid, the type of cooling fluid, the volumetric throughput of cooling system 300, and the type and/or efficiency of the heat exchanger. In alternative embodiments, cooling system 300 includes any component that facilitates operation of component rework system 100.

In the exemplary embodiment, die 200 is fabricated from a first material 236 having a first thermal expansion coefficient, frame 204 is fabricated from a second material 238 having a second thermal expansion coefficient, and ram 202 is fabricated from a third material 240 having a third thermal expansion coefficient. In the exemplary embodiment, first material 236 and second material 238, and thus the first thermal expansion coefficient and the second thermal expansion coefficient, are the same, and third material 240 is different from first material 236 and second material 238. In at least some embodiments, a thermal expansion coefficient of component 106 is greater than each of the first thermal expansion coefficient, the second thermal expansion coefficient, and the third thermal expansion coefficient. The third thermal expansion coefficient of third material 240 is greater than the first and second thermal expansion coefficients, resulting in a predetermined thermal expansion of some components of rework press assembly 104 relative to other components of rework press assembly 104 that facilitates operation of component rework system 100 without a need for mechanical or hydraulic press system, as will be further described herein.

In the exemplary embodiment, first material 236 and second material 238 are a titanium-zirconium-molybdenum alloy, and third material 240 is a nickel-based superalloy such as RENÉ 108, facilitating differential thermal expansion. For example, the thermal expansion coefficient of the titanium-zirconium-molybdenum alloy is about ⅔ that of the RENÉ 108 alloy. Alternatively, first material 236 and second material 238 are also nickel-based superalloys such as RENÉ 108, but are configured to interact with a cooling fluid to facilitate differential thermal expansion with respect to third material 240, as will be described below. In alternative embodiments, first material 236, second material 238, and third material 240 are each at least one of titanium-zirconium-molybdenum alloy, R108 alloy, GTD111® ("GTD111" is a registered trademark of General Electric Company located of Schenectady, N.Y.) alloy, IN 738® ("IN 738" is a registered trademark of Huntington Alloys Corporation of Burnaugh, Ky.) alloy, René 5® ("René 5" is a registered trademark of General Electric Company located of Schenectady, N.Y.) alloy, René 4® ("René 4" is a registered trademark of General Electric Company located of Schenectady, N.Y.) alloy, and a nickel-based superalloy having a gamma prime phase volume fraction of at least fifty percent. In other alternative embodiments, first material 236 and second material 238 are each at least one of a graphite material and a ceramic material. In an additional alternative embodiment, first material 236 and third material 240 are the same, the first thermal expansion coefficient and the third thermal expansion coefficient are the same, and second material 238 is different from first material 236 and third material 240 such that the die and the ram are reversed. In further alternative embodiments, rework press assembly 104 has any combination of materials having any thermal coefficients that facilitate operation of component rework system 100 as described herein.

In the exemplary embodiment, component 106 is a turbine nozzle fabricated from material 108 having high-strength and low ductility physical properties. More specifically, component 106 is a turbine nozzle, and material 108 is RENÉ 108 alloy. In alternative embodiments, component 106 is fabricated from a nickel-based superalloy having a gamma prime phase volume fraction of at least thirty percent. In further alternative embodiments, component 106 is fabricated from any material having any strength and ductility that responds to a rework process as is described herein. In the exemplary embodiment, with reference to FIG. 2, component 106 is at a first, distorted condition, having a dimensional distortion in a base 242 of first portion 210, as illustrated in FIG. 2. In alternative embodiments, component has a dimensional distortion in at least one of an airfoil 244 and a tip feature 246 of component 106. In further alternative embodiments, component 106 has any type, size, and number of dimensional distortions that are correctable using component rework system 100 as described herein.

In FIG. 2, component 106 and rework press assembly 104 are illustrated at a first thermal condition, i.e., a first temperature. In the exemplary embodiment, the first thermal condition is associated with a resting, i.e. non-reworking, and/or initial starting condition of component rework system 100. In alternative embodiments, the first thermal condition is associated with any suitable condition of rework press assembly 104 and/or component 106. In response to component 106 and rework press assembly 104 being at the first thermal condition, ram 202 is a ram first length 248, relative to press longitudinal axis 206, and die 200 is a die first length 249, relative to press longitudinal axis 206. In the exemplary embodiment, ram 202 is illustrated as not being in contact with second portion 216 of component 106 at the first thermal condition. In alternative embodiments, ram 202 is in contact with component 106 at the first thermal condition. In other alternative embodiments, ram 202 contacts component 106 in as many locations as enables rework press assembly 104 to function as described herein.

In FIG. 3, component 106 and rework press assembly 104 are illustrated at a second thermal condition, i.e. a second temperature. In the exemplary embodiment, the second thermal condition is associated with a completed rework set point condition of component rework system 100. In alternative embodiments, the second thermal condition is associated with any suitable condition of component rework system 100 and/or component 106. In response to component 106 and rework press assembly 104 being at the second thermal condition, ram 202 is a ram second length 250 relative to press longitudinal axis 206, wherein ram second length 250 is greater than ram first length 248, and die 200 is a die second length 252 relative to press longitudinal axis 206, wherein die second length 252 is substantially the same as die first length 249. In the exemplary embodiment, in cooperation with component rework system 100, ram 202 is sized and positioned such that when rework press assembly 104 and component 106 are at the second thermal condition, component 106 has been deformed by a predetermined amount as a result of the change in length of ram 202 due to the thermal expansion of ram 202.

More specifically, with reference to FIGS. 2 and 3, as rework press assembly 104 transitions from the first thermal condition to the second thermal condition, ram 202 undergoes thermal expansion. The thermal expansion of ram 202 causes ram 202 to expand at least in length along press longitudinal axis 206. In the exemplary embodiment, an elastic modulus of component 106 is less than any of an elastic modulus of ram 202, an elastic modulus of die 200, and an elastic modulus of frame 204, such that ram 202 transitioning to ram second length 250 compresses component 106 between ram 202 and die 200 with sufficient force to additionally overcome any thermal expansion of component 106, causing component 106 to deform by a predetermined amount. In alternative embodiments, the elastic moduli of at least one of ram 202, die 200, and frame 204 are less than the elastic modulus of component 106 and the at least one of ram 202, die 200, and frame 204 includes a cooling passageway 302.

In the exemplary embodiment, the thermal expansion of a material along a given dimension, $\delta$, is related to a coefficient of linear thermal expansion of the material, $\alpha$, a change in temperature from a first thermal condition, T1, to a second thermal condition, T2, and a size of the dimension, L. In the exemplary embodiment, at least the following equation is utilized to determine an amount of strain, $\varepsilon$, experienced by component 106 within rework press assembly 104 as a result of component 106 and rework press assembly 104 transitioning from the first thermal condition to the second thermal condition, wherein first material 236 of die 200 has a thermal expansion coefficient that is substantially smaller than a thermal expansion coefficient of third material 240 of ram 202:

$$\varepsilon = ((L_{r1}\alpha_c - L_{p1}\alpha_p + L_{p1}\alpha_r)(T_2 - T_1) - \delta)/L_{c1} \qquad \text{Eq. 1}$$

wherein $L_{c1}$ represents component length 110 at the first thermal condition, $\alpha_c$ represents the thermal expansion coefficient of component 106, $L_{p1}$ represents the length of rework press assembly 104 at the first thermal condition, $\alpha_p$ represents the thermal expansion coefficient of rework press assembly 104, $L_{r1}$ represents the length of ram 202 at the first thermal condition, $\alpha_r$ represents the thermal expansion coefficient of ram 202, and $\delta$ is ram gap 202.

Component 106 is examined using at least one of a coordinate-measuring machine (CMM) process, a blue light three-dimensional scanning process, and a gage measurement process, for example, and a dimensional deviation of component 106 from a dimensional correct component 106 is determined. Using at least the above equation, finite element modeling (FEM) is performed on component 106 and rework press assembly 104 in a solid modeling program, for example, to determine a plurality of first dimensions that the components of rework press assembly 104 must have at the first thermal condition in order to yield the dimensionally correct component 106 at the second thermal condition. Component 106 and rework press assembly 104 are then caused to transition from the first thermal condition to the second thermal condition, causing permanent deformation of component 106 as a result of at least one of a yield and a creep mechanism within material 108, resulting in the dimensionally correct component 106. In an alternative example, the thermal expansion, strain, and deformation of each of rework press assembly 104 and component 106 is calculated using any method that enables component rework system 100 to function as described herein.

Although dimensional correction of component 106 is described above in terms of a correction along press longitudinal axis 206, using die 200 and ram 202 oppositely positioned along press longitudinal axis 206, it should be understood that, in some embodiments, corrections of non-conforming rotation and tilt dimensions of component 106 are accomplished in a substantially identical manner using die 200 and ram 202 oppositely placed with respect to any suitable axis of rework press assembly 104. For example, die 200 and ram 202 are oppositely placed along an axis perpendicular to press longitudinal 206 and out of the page in the view of FIGS. 2 and 3, and also offset from each other along press longitudinal axis 206 to correct a tilt dimensional non-conformity of component 106. For another example, die 200 and ram 202 are further offset from each other along an axis perpendicular to press longitudinal axis 206 and in the plane of the page in the view of FIGS. 2 and 3 to correct a rotational non-conformity of component 106.

Figure 4:
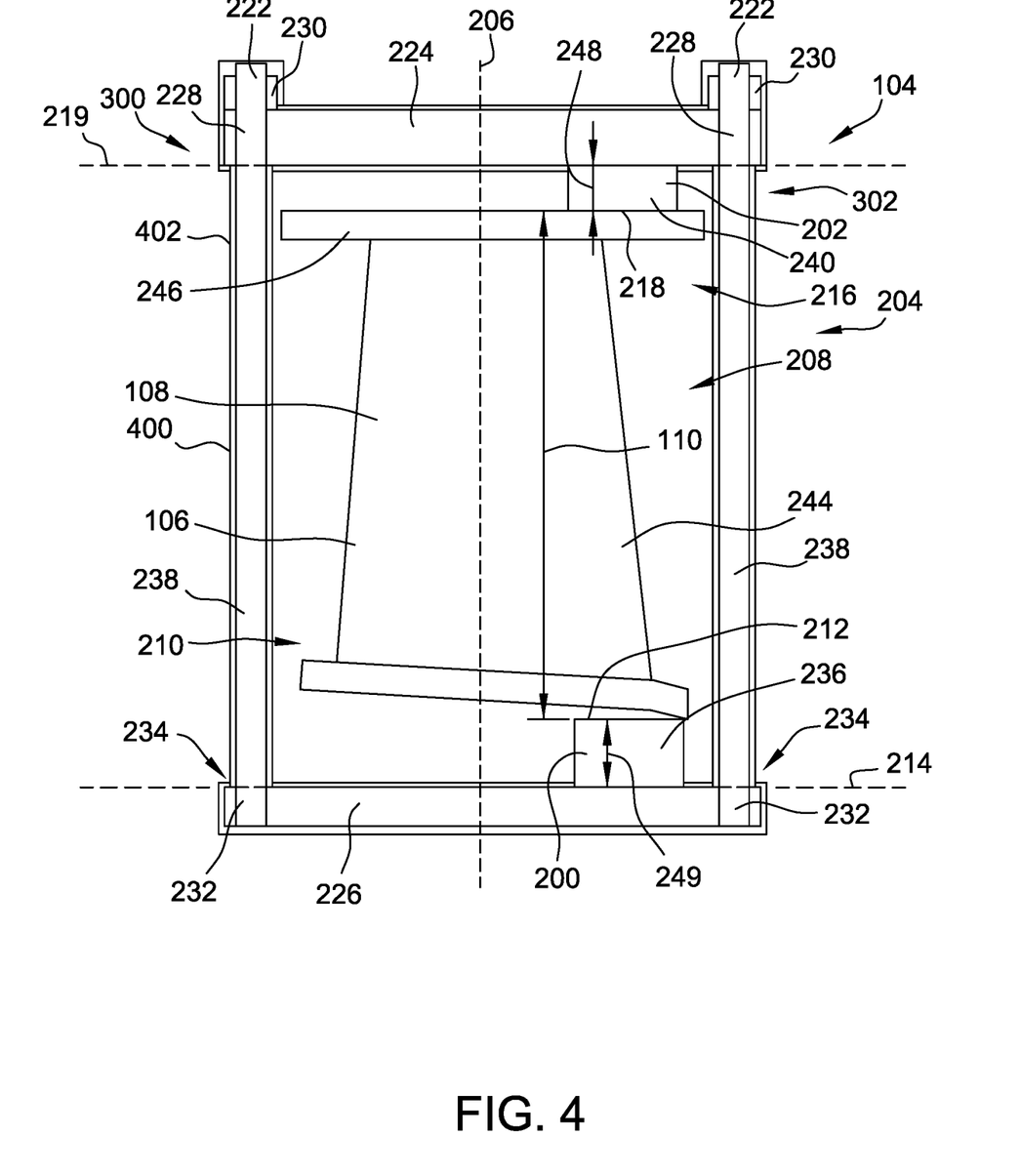
FIG. 4 is a cross-sectional side view of a first alternative embodiment of the rework press assembly shown in FIG. 2 illustrating the first alternative embodiment of the rework press assembly at the first thermal condition.
Figure 5:
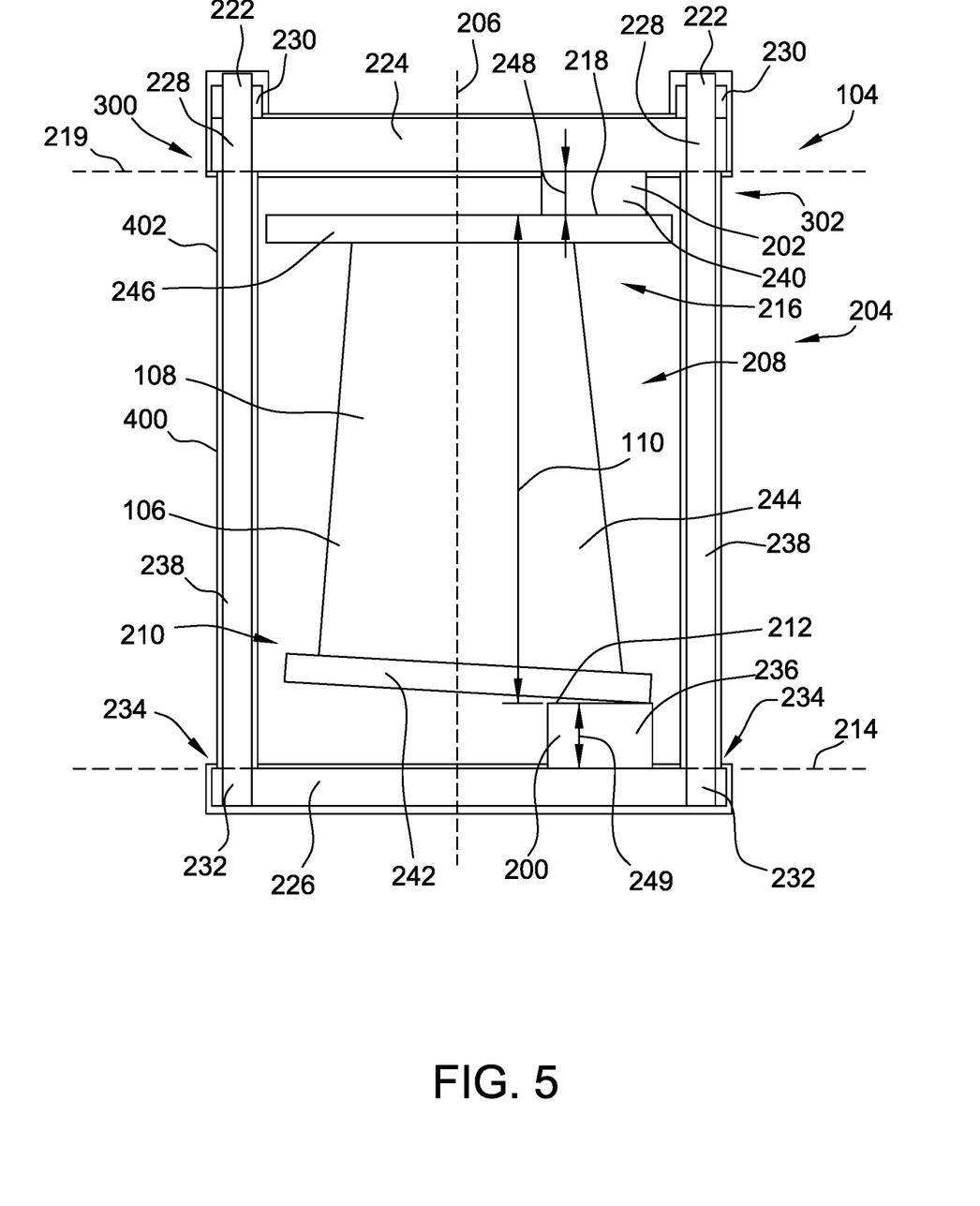
FIG. 5 is a cross-sectional side view of the rework press assembly shown in FIG. 4 illustrating the rework press assembly at the second thermal condition.

FIG. 4 is a cross-sectional side view of a first alternative embodiment of rework press assembly 104 (shown in FIG. 2) illustrating the first alternative embodiment of rework press assembly 104 at the first thermal condition. FIG. 5 is a cross-sectional side view of the first alternative embodiment of rework press assembly 104 (shown in FIG. 4) illustrating the first alternative embodiment of rework press assembly 104 at the second thermal condition. The embodiment of rework press assembly 104 shown in FIGS. 4 and 5 is substantially identical to the embodiment shown in FIGS. 2 and 3, except that ram 202 and die 200 are pedestals located and configured to contact solely predetermined portions of the end profiles of component 106, and frame 204 is substantially surrounded by an insulation 400. In alternative embodiments, any component of rework press assembly 104 is substantially surrounded by insulation 400. In the exemplary embodiment, at the first thermal condition, ram 202 is ram first length 248, relative to press longitudinal axis 206, die 200 is die first length 249, relative to press longitudinal axis 206, die 200 is in contact with first portion 210, and ram 202 is in contact with second portion 216.

In the exemplary embodiment, in response to component rework system 100 and component 106 being at the second thermal condition, ram 202 is ram second length 250 and die 200 is die second length 252, wherein die second length 252 is greater than die first length 249, and ram second length 250 is greater than ram first length 248. Using the alternative embodiment of rework press assembly 104, component 106 is reworked by applying force to specific locations of opposite ends of component 106 as a result of thermal expansion occurring in ram 202 and die 200.

In the exemplary embodiment, insulation 400 is fabricated from an insulation material 402 that inhibits heat transfer to frame 204 of rework press assembly 104. More specifically, insulation material 402 is a ceramic material having a low rate of heat transfer and is positioned to substantially surround frame 204. Insulation 400 reduces susceptibility of frame 204 to thermal expansion and thus facilitates use of second material 238 having an equal or lesser resistance to creep and/or deformation as a result of elevated thermal conditions as compared to material 108 of component 106. In alternative embodiments, insulation material 402 is at least one of a rock wool material and a ceramic fiber material. In further alternative embodiments, insulation 400 is used in cooperation with cooling system 300. In yet another alternative embodiment, insulation 400 is fabricated from any material and positioned along any portion of rework system 100 that facilitates operation of rework system 100 as described herein.

Figure 6:
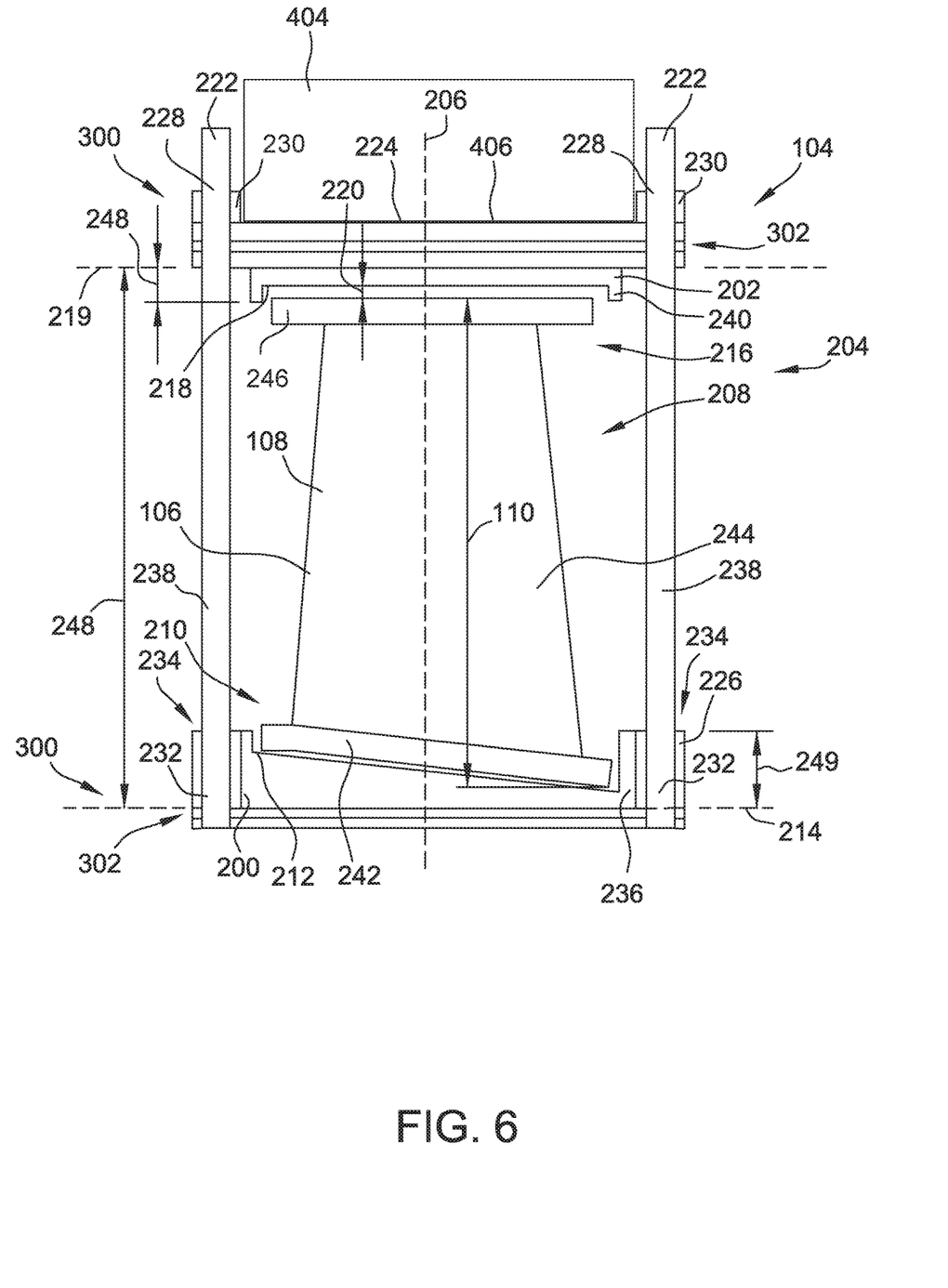
FIG. 6 is a cross-sectional side view of a second alternative embodiment of the rework press assembly shown in FIG. 2 illustrating the second alternative embodiment of the rework press assembly at the first thermal condition.

FIG. 6 is a cross-sectional side view of a second alternative embodiment of rework press assembly 104 (shown in FIG. 2) illustrating the second alternative embodiment of rework press assembly 104 at the first thermal condition. The embodiment of rework press assembly 104 shown in FIG. 6 is substantially identical to the embodiment shown in FIGS. 2 and 3, except that a mass 404 is coupled to an outer portion 406 of ram 202. In the exemplary embodiment, mass 404 is a static mass configured to cooperate with rework press assembly 104 to rework dimensionally non-conformant component 106 by applying a force proportional to the weight of mass 404 to component 106 via ram 202. For example, mass 404 is selected to be a 9 kilogram (20 pound) mass in order to produce a corresponding preselected deformation of component 106. In another example, mass 404 is selected to be a 16 kilogram (35 pound) mass in order to generate a local deformation of up to 0.01 inches in a component fabricated of RENÉ 108 alloy. It should be understood that in the illustrated embodiment, press longitudinal axis 206 is substantially aligned with a vertical direction. In alternative embodiments, mass 404 has any mass and is coupled to any portion of rework press assembly 104 that facilitates operation of rework press assembly 104 as described herein. In further additional embodiments, rework press assembly 104 includes disengagement apparatuses (not shown) configured to disengage an application of a force to component 106 due to mass 404 after a preselected amount of rework of component 106 has been completed. In another additional embodiment, an arm (not shown) is coupled to component 106 and mass 404 is spaced apart from component 106 and coupled to the arm such that a moment is generated at component 106 to facilitate reworking component 106. In some embodiments, mass 404 is applied to re-work component 106 without an accompanying change in thermal condition of component rework system 100.

Figure 7:
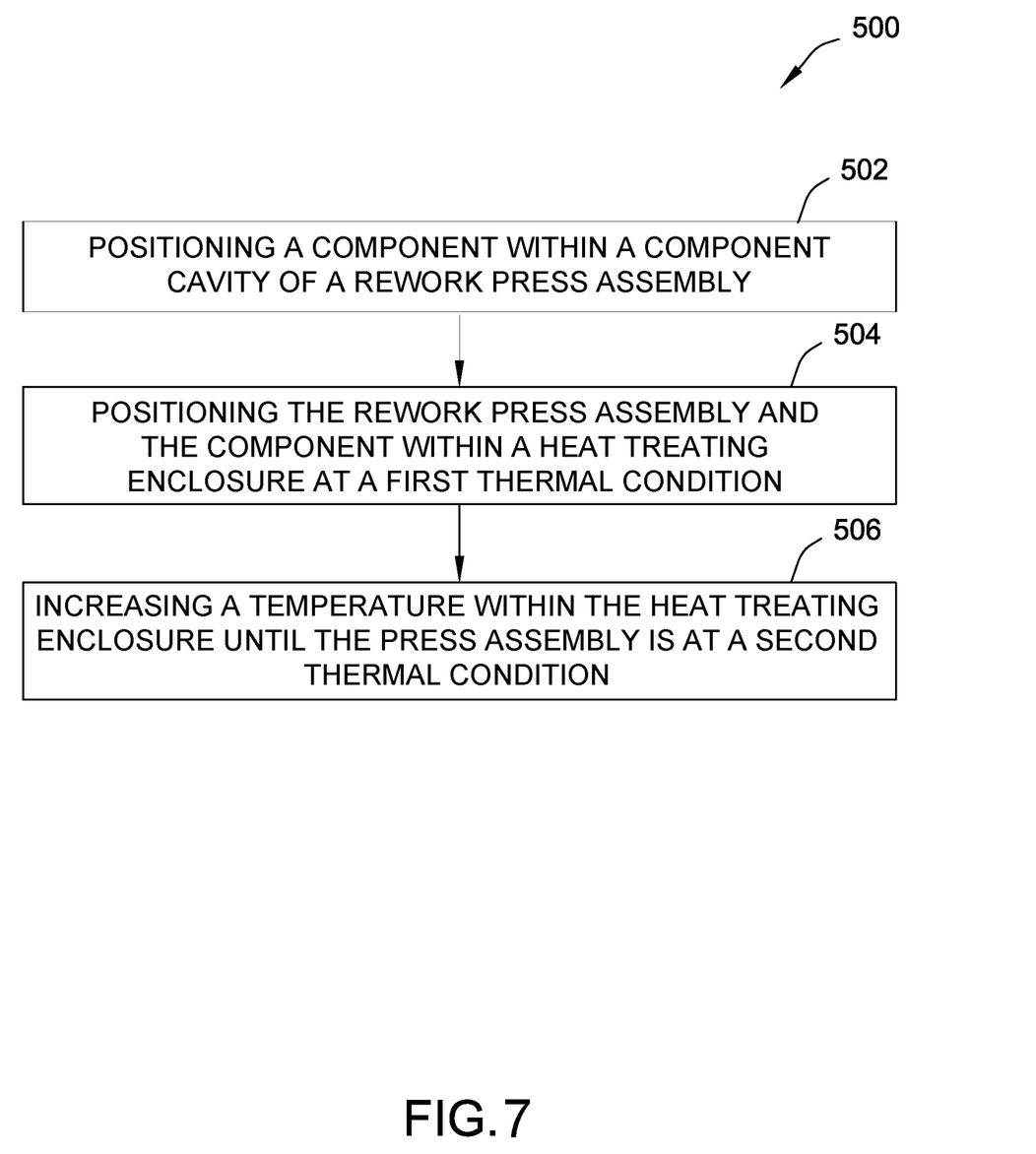
FIG. 7 is a flow diagram of an exemplary method for reworking a dimensionally non-conforming component using a component rework system, such as the component rework systems shown in FIGS. 1, 4, and 6.

FIG. 7 is a flow diagram of an exemplary method 500 for reworking a dimensionally non-conformant component using a component rework system, such as the component rework system 100 (shown in FIG. 1). With reference to FIGS. 1-6, method 500 includes positioning 502 a component, such as component 106, within a component cavity, such as component cavity 208, of a press assembly, such as rework press assembly 104, wherein the press assembly includes a die, such as die 200, configured to contact a first portion, such as first portion 210, of the component, a ram, such as ram 202, configured to contact a second portion, such as second portion 216, of the component, the ram positioned opposite the die along a press longitudinal axis, such as press longitudinal axis 206, and defining the component cavity therebetween, wherein at least one of the die and the ram is a first length, such as ram first length 248 and/or die first length 249, relative to the press longitudinal axis, in response to the press assembly being at a first thermal condition, wherein the at least one of the die and the ram is a second length, such as ram second length 250 and/or die second length 252, relative to the press longitudinal axis, in response to the press assembly being at a second thermal condition, and wherein the second length is greater than the first length, and a frame, such as frame 204, extending between the die and the ram. Method 500 also includes positioning 504 the press assembly and the component within a heat treating enclosure, such as heat treating enclosure 102, at the first thermal condition. Finally, method 500 includes increasing 506 a temperature within the heat treating enclosure until the press assembly is at the second thermal condition. In additional embodiments, method 500 includes additional steps including determining an amount of dimensional non-conformance in the component, calculating a thermal expansion of the component, calculating a thermal expansion of the press assembly, and determining a second thermal condition to facilitate reworking the component using the press assembly.

The above-described embodiments overcome at least some of the disadvantages of known rework systems for components having high strength and low ductility material properties, such as components formed from superalloys. The above-described embodiments facilitate correcting dimensional distortions in a component fabricated of high-strength and low-ductility materials, such as nickel-based superalloys, while inhibiting degradation of the mechanical and structural capabilities of the component. The above-described embodiments also facilitate the controlled, accurate correction of dimensional non-conformances in the in a single instance of the process, improving upon trial-and-error processes required for at least some known methods for correcting dimensional non-conformances, such as hot-spotting and traditional component straightening processes. Additionally, at least partially due to the heat treating process, the above-described embodiments facilitate correcting dimensional non-conformance in a component while inhibiting the introduction of residual stresses within the component. The embodiments include a rework press assembly for reworking a dimensionally distorted component. The rework press assembly includes a die configured to contact a first portion of the component, a ram configured to contact a second portion of the component, and a frame extending between the die and the ram. The ram is positioned opposite the die along a press longitudinal axis and defines a component cavity therebetween, wherein the ram is a first length, relative to the press longitudinal axis, in response to the rework press assembly being at a first thermal condition and the ram is a second length, relative to the press longitudinal axis, in response to the press being at a second thermal condition, and wherein the second length is greater than the first length. Thus, after positioning the component to be reworked within the component cavity between the die and the ram, the temperature of the rework press assembly and the component is elevated to a predetermined temperature determined to result in a length increase of the ram such that the ram compresses the component by a predetermined amount to correct the dimensional distortion. Additionally, the rework press assembly facilitates inhibiting over-compression of the component as the ram length increases by the predetermined amount associated with the second thermal condition and no further, unless the temperature is increased beyond the second thermal condition. In some embodiments, the die and the ram are contoured complimentarily to dimensional correct ends of the component to facilitate precise reworking of the component.

Exemplary embodiments of a rework press assembly, and rework systems and methods incorporating the rework system, are described above in detail. The systems and methods are not limited to the specific embodiments described herein, but rather, components of systems and/or steps of methods may be utilized independently and separately from other components and/or steps described herein. For example, the rework press assembly may also be used in combination with other machines and methods, and is not limited to practice with only the rework system as described herein. Rather, the embodiments can be implemented and utilized in connection with many other applications.

Although specific features of various embodiments of the disclosure may be shown in some drawings and not in others, this is for convenience only. Moreover, references to "one embodiment" in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to illustrate the disclosure and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A rework press assembly for reworking a dimensionally non-conformant component, the dimensionally non-conformant component including a first material having a first thermal expansion coefficient, said rework press assembly comprising:
   a frame comprising a second material having a second thermal expansion coefficient;
   a die comprising a third material having a third thermal expansion coefficient, said die coupled to said frame and configured to contact a first portion of the component, wherein the second and third thermal expansion coefficients are less than the first thermal expansion coefficient; and
   a ram coupled to said frame opposite said die with respect to an axis of the rework press assembly, said ram configured to contact a second portion of the component, said ram and said die defining a component cavity therebetween,
      wherein said ram has a first length, relative to the axis, in response to said rework press assembly being at a first thermal condition, such that a ram gap is defined between the dimensionally non-conformant component and said ram when said rework press assembly is at the first thermal condition,
      wherein said ram has a second length, relative to the axis, in response to said rework press assembly being at a second thermal condition, wherein the second length is longer than the first length, and wherein the second thermal condition occurs at a second temperature that is higher than a first temperature at the first thermal condition, and wherein the ram gap is at least reduced when said rework press assembly is at the second thermal condition,
   wherein at least one of said frame, said die, and said ram comprises a cooling passageway that directs a flow of cooling fluid through said at least one of said frame, said die, and said ram to facilitate controlling differential thermal expansion between at least one of said frame, said die, said ram, and the dimensionally non-conforming component and another of at least one of said frame, said die, said ram, and the dimensionally non-conformant component, and
   wherein the differential thermal expansion compresses the dimensionally non-conforming component between said ram and said die.

2. The rework press assembly according to claim 1, wherein said ram comprises a plurality of rams selectively positionable at a plurality of locations along a ram plane substantially perpendicular to the axis.

3. The rework press assembly according to claim 1, wherein said die comprises a plurality of dies selectively positionable at a plurality of locations along a die plane substantially perpendicular to the axis.

4. The rework press assembly according to claim 1, wherein at least one of said die and said ram comprises a forming surface contoured complementary to a respective one of a dimensionally correct profile of said first portion and a dimensionally correct profile of said second portion of the component.

5. The rework press assembly according to claim 1, wherein said ram comprises a fourth material having a fourth thermal expansion coefficient that is different from the second and third thermal expansion coefficients.

6. The rework press assembly according to claim 5, wherein said second material and said third material each comprise at least one of a titanium-zirconium-molybdenum alloy and a nickel-based superalloy having a gamma prime phase volume fraction of at least fifty percent.

7. The rework press assembly according to claim 1, further comprising an insulation material substantially surrounding at least one of said frame, said die, and said ram and configured to inhibit heat transfer.

8. The rework press assembly according to claim 1, further comprising at least one mass coupleable to at least one of said ram and said die, said at least one mass configured to cooperate with said rework press assembly to apply a force to the component for reworking the dimensionally non-conformant component.

9. A component rework system comprising:
   a heat treating enclosure comprising an inner environment configured to receive thermal energy;
   a dimensionally non-conformant component comprising a first material having a first thermal expansion coefficient
   a rework press assembly for reworking the dimensionally non-conformant component, said rework press assembly positioned within said inner environment and comprising:
      a frame comprising a second material having a second thermal expansion coefficient;

a die comprising a third material having a third thermal expansion coefficient, said die coupled to said frame and configured to contact a first portion of the component; and a ram coupled to said frame opposite said die with respect to an axis of the rework press assembly, said ram configured to contact a second portion of the component, said ram and said die defining a component cavity therebetween, wherein the first thermal expansion coefficient is greater than the second and the third thermal expansion coefficients, wherein said ram has a first length, relative to the axis, in response to said rework press assembly being at a first thermal condition, such that a ram gap is defined between the dimensionally non-conformant component and said ram when said rework press assembly is at the first thermal condition, wherein said ram has a second length, relative to the axis, in response to said rework press assembly being at a second thermal condition, and wherein the second length is longer than the first length, and wherein the ram gap is at least reduced when said rework press assembly is at the second thermal condition, and wherein the second thermal condition occurs at a second temperature that is higher than a first temperature of the first thermal condition, wherein at least one of said frame, said die, and said ram comprises a cooling passageway that directs a flow of cooling fluid through said at least one of said frame, said die, and said ram to facilitate controlling differential thermal expansion between at least one of said frame, said die, said ram, and the dimensionally non-conforming component and another of at least one of said frame, said die, said ram, and the dimensionally non-conformant component, wherein the differential thermal expansion compresses the dimensionally non-conforming component between said ram and said die.

10. The component rework system according to 9, wherein said ram comprises a plurality of rams positionable at a plurality of locations along a ram plane substantially perpendicular to the axis.

11. The component rework system according to claim 9, wherein said die comprises a plurality of dies positionable at a plurality of locations along a die plane substantially perpendicular to the axis.

12. The component rework system according to claim 9, wherein at least one of said die and said ram comprises a forming surface contoured complementary to a respective one of a dimensionally correct profiles of said first portion and a dimensionally correct profile of said second portion of the component.

13. The component rework system according to claim 9, wherein said ram comprises a fourth material having a fourth thermal expansion coefficient that is different from the second and third thermal expansion coefficients.

14. The component rework system according to claim 13, wherein said second material and said third material each comprise at least one of a titanium-zirconium-molybdenum alloy and a nickel-based superalloy having a gamma prime phase volume fraction of at least fifty percent.

15. The component rework system according to claim 9, further comprising an insulation material substantially surrounding at least one of said frame, said die, and said ram and configured to inhibit heat transfer.

16. The component rework system according to claim 9, further comprising at least one mass coupleable to at least one of said ram and said die, said at least one mass configured to cooperate with said rework press assembly to apply a force to the component for reworking the dimensionally non-conformant component.

17. A method of reworking a component, said method comprising:

positioning a component comprising a first material having a first thermal expansion coefficient within a component cavity of a rework press assembly, wherein the rework press assembly includes:

a frame comprising a second material having a second thermal expansion coefficient;

a die comprising a third material having a third thermal expansion coefficient, the die coupled to the frame and configured to contact a first portion of the component, wherein the first thermal expansion coefficient is greater than the second and third thermal expansion coefficients; and a ram coupled to the frame opposite the die with respect to an axis of the rework press assembly, the ram configured to contact a second portion of the component, the ram and the die defining the component cavity therebetween, wherein the ram has a first length, relative to the axis, in response to the rework press assembly being at a first thermal condition, and wherein a ram gap is defined between the component and the ram when the rework press assembly is at the first thermal condition, wherein the ram has a second length, relative to the axis, in response to the rework press assembly being at a second thermal condition, wherein the second length is longer than the first length and wherein the second thermal condition occurs at a second temperature that is higher than a first temperature of the first thermal condition, such that the ram gap is at least reduced when said rework press assembly is at the second thermal condition, and wherein at least one of said frame, said die, and said ram comprises a cooling passageway therein; and positioning the rework press assembly and the component within a heat treating enclosure at the first thermal condition;

increasing a temperature within the heat treating enclosure until the rework press assembly is at the second thermal condition; and routing cooling fluid through each cooling passageway to facilitate controlling differential thermal expansion between at least one of said frame, said die, said ram, and the component and another of at least one of said frame, said die, said ram, and the component, wherein the differential thermal expansion compresses the component between said ram and said die.

18. The method according to claim 17, wherein the ram comprises a fourth material having a fourth thermal expansion coefficient that is different from the second and third thermal expansion coefficients.

19. The method according to claim 17 wherein positioning the component within the component cavity of the rework press assembly comprises positioning the first portion of the component against a forming surface of the die contoured complementary to a dimensionally correct profile of the first portion of the component.

* * * * *